(12) United States Patent
Giffin, III

(10) Patent No.: US 6,672,072 B1
(45) Date of Patent: Jan. 6, 2004

(54) PRESSURE BOOSTED COMPRESSOR COOLING SYSTEM

(75) Inventor: Rollin G. Giffin, III, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/134,993

(22) Filed: Aug. 17, 1998

(51) Int. Cl.$^7$ ................................................. F02C 6/08
(52) U.S. Cl. .............................. 60/782; 60/728; 60/806
(58) Field of Search ................................ 60/39.07, 728, 60/736, 39.75, 806; 415/58.5, 115, 116

(56) References Cited

U.S. PATENT DOCUMENTS

| | | | |
|---|---|---|---|
| 3,632,221 A | | 1/1972 | Uehling |
| 4,808,073 A | | 2/1989 | Zaehring et al. |
| 4,919,590 A | | 4/1990 | Stratford et al. |
| 4,961,309 A | * | 10/1990 | Liebl ........................... 60/39.07 |
| 5,163,285 A | | 11/1992 | Mazeaud et al. |
| 5,226,785 A | | 7/1993 | Narayana et al. |
| 5,245,821 A | * | 9/1993 | Thomas, Jr. et al. ....... 60/39.75 |
| 5,269,133 A | | 12/1993 | Wallace |
| 5,297,386 A | | 3/1994 | Kervistin |
| 5,317,877 A | | 6/1994 | Stuart |
| 5,619,855 A | | 4/1997 | Burrus |

FOREIGN PATENT DOCUMENTS

GB 2301631 A 12/1996
GB 2309269 A 7/1997

OTHER PUBLICATIONS

"ventilator", Academic Press Dictionary of Science and Technology, www.harcourt.com/dictionary, Dec. 2000.*
Eckert and Drake, Heat and Mass Transfer, McGraw–Hill, New York, p. 121, 1959.*

* cited by examiner

Primary Examiner—Ehud Gartenberg
(74) Attorney, Agent, or Firm—William Scott Andes; Steven J. Rosen

(57) ABSTRACT

A gas turbine engine cooling system for providing cooling air to engine components includes a core engine and, in downstream serial flow relationship, a high pressure compressor, a combustor, and high pressure turbine. A first flowing system is used for flowing a portion of the pressurized air to a heat exchanger to cool the pressurized air and provide the cooling air and a second flowing system is used for flowing a first portion of the cooling air to a compressor impeller operably connected to a compressor disk of the high pressure compressor for boosting pressure of the first portion of the cooling air. A second portion of the cooling air is supplied to turbine cooling. The heat exchanger may be a fuel to air heat exchanger for cooling the portion of the pressurized air from the first flowing means with fuel. Preferably, a first plurality of diffuser vanes extending radially across the core flowpath and each includes at one radial vane airflow passage for conveying the cooling air across the core flowpath to the compressor impeller and the turbine cooling apparatus.

19 Claims, 4 Drawing Sheets

PRESSURE BOOSTED COMPRESSOR COOLING SYSTEM

BACKGROUND OF THE INVENTION

1. Field of the Invention

The present invention relates to the cooling of gas turbine engine components and, more particularly, to a system for providing tailored pressure boosted cooling flows for high pressure compressor and turbine components.

2. Discussion of the Background Art

Gas turbine engines typically include cooling systems which provide cooling air to turbine rotor components, such as turbine blades, in order to limit the material temperatures experienced by such components. Prior art cooling systems usually acquire the air used to cool turbine components from the engine's compressor, after which it is diverted and subsequently directed to the turbine section of the engine through an axial passageway. A device commonly known as an inducer is generally employed, at the end of the passageway, to accelerate and direct the airflow tangential to and in the same direction of the rotating rotor. Such inducers, frequently in the form of a circumferentially disposed array of vanes, are used to control the tangential speed and direction of the airflow so that it is substantially equal to that of the turbine rotor. An exemplary inducer utilized for such purpose is disclosed in U.S. Pat. No. 4,882,902 to James R. Reigel et al., entitled "Turbine Cooling Air Transferring Apparatus". Another inducer performing a similar function to the vane-type inducer is disclosed in U.S. Pat. No. 5,245,821 to Theodore T. Thomas Jr. et al. entitled "Stator to Rotor Flow Inducer," where a plurality of cylindrical airflow passages are disposed circumferentially about the engine centerline and includes cooling airflow holes or passages that are acutely angled in a tangential manner to the rotational direction of the rotor. The passages include a downstream angled outlet in the form of an open channel that is angled in a rotational direction of the rotor and has a back wall that is at a small acute angle with respect to a plane perpendicular to a centerline of the rotor.

Modern aircraft gas turbine engines are being designed with high overall pressure ratios to increase engine efficiency. Such engines can have compressor discharge or exit temperatures in the regime of 1600° F. and higher which can exceed the operating temperature capabilities of component materials. Accordingly, conventional cooling using compressor discharge air is not always feasible because of the high temperature of this air. One technique to reduce the temperature of the compressor discharge air for cooling purposes is cool this air with a cooler fluid, such as fuel, in a heat exchanger as shown in U.S. Pat. No. 5,619,855.

Aircraft gas turbine engine designers constantly strive to improve the efficiency of the gas turbine engine. The use of cooling air increases fuel consumption and, therefore, it is highly desirable to minimize the amount of engine work used to produce the cooling air. The pressure requirements for cooling high pressure compressor components is greater than that of the turbine components but uses a much smaller percentage of cooling airflow, perhaps about 10% of the total cooling airflow. The prior art teaches boosting all of the cooling airflow with an air powered turbo-compressor or other type of supplemental compressor located outside of the engine casing. This wastes fuel by boosting the pressure of the cooling airflow portion that goes to the turbine components to excessive levels. Turbo-compressors are heavy and, therefore, add weight and complexity to the engine.

Accordingly, it is highly desirable to have an engine cooling system capable of efficiently supplying high pressure cooling air to high pressure compressor and turbine components of an aircraft gas turbine engine without wasting engine power.

SUMMARY OF THE INVENTION

A gas turbine engine cooling system for providing cooling air to engine components includes a core engine having a core flowpath therethrough and, in downstream serial flow relationship, a high pressure compressor, a combustor, and high pressure turbine drivingly connected to the high pressure compressor. A first flowing means is provided for flowing a portion of pressurized air from the high pressure compressor to a heat exchanger to cool the pressurized air and provide cooling air. A second flowing means is provided for flowing a first portion of the cooling air from the heat exchanger to a compressor impeller for boosting pressure of the first portion of the cooling air. The second flowing means is also used to flow a second portion of the cooling air to a turbine cooling means for cooling components of the high pressure turbine. The compressor impeller is operably connected to a compressor disk of the high pressure compressor.

The compressor impeller preferably has a first plurality of compressor radial impeller passages with compressor impeller inlets located on a downstream facing side of a downstream tapering conical shaft section of a high pressure rotor connected to a downstream facing side of the compressor disk. A compressor inducer is operably disposed to channel the first portion of the cooling air into the compressor impeller inlets in a direction substantially tangential to the compressor disk. The heat exchanger may be a fuel to air heat exchanger for cooling the portion of the pressurized air from the first flowing means with fuel. The combustor may be connected to the heat exchanger to receive the fuel from the heat exchanger after the fuel has been used for cooling the portion of the pressurized air from the first flowing means.

One embodiment of the present invention incorporates a first plurality of vanes positioned circumferentially around and extending radially across the core flowpath and axially between the core compressor and the combustor. The second flowing means includes at least one radial vane airflow passage through each of the first plurality of vanes. A hollow area may also be provided within at least some of the vanes effective for receiving the fuel for injection into the core flowpath through apertures such as atomizers positioned across sides of some of the vanes.

The turbine cooling means may include a turbine impeller for boosting pressure of the second portion of the cooling air and the turbine impeller may include a second plurality of radial impeller passages with turbine impeller inlets located on an upstream facing side of the turbine disk, and a second inducer effective for channeling the second portion of the cooling air into the turbine impeller inlets in a direction substantially tangential to the turbine disk.

ADVANTAGES OF THE INVENTION

The present invention has the advantage of being able to tailor the cooling airflows used to cool portions of the high pressure compressor and high pressure turbine to maximize the overall efficiency of the gas turbine engine. The present invention is less costly to build and maintain and less complicated than using an externally mounted turbo-compressor to boost the pressure of the cooling air. The present invention provides apparatus to supply different pressure levels of the cooling flows directed to sections of the high pressure compressor and turbine sections thereby minimizing any ducting or routing losses and unnecessary compression of cooling air directed to the turbine sections. These losses are due to ducting the air outside the engine casing, compressing the air to excessive levels, cooling the air, and then wasting the energy used to over boost the pressure of cooling air needed for the turbine sections which is lower than that of the high pressure compressor. The turbo-compressor also uses more energy and, thus, the apparatus of the present invention is more fuel efficient and less costly to operate because of its ability to tailor the boost pressure of the cooling airflow that are directed to the high pressure compressor and turbine components.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
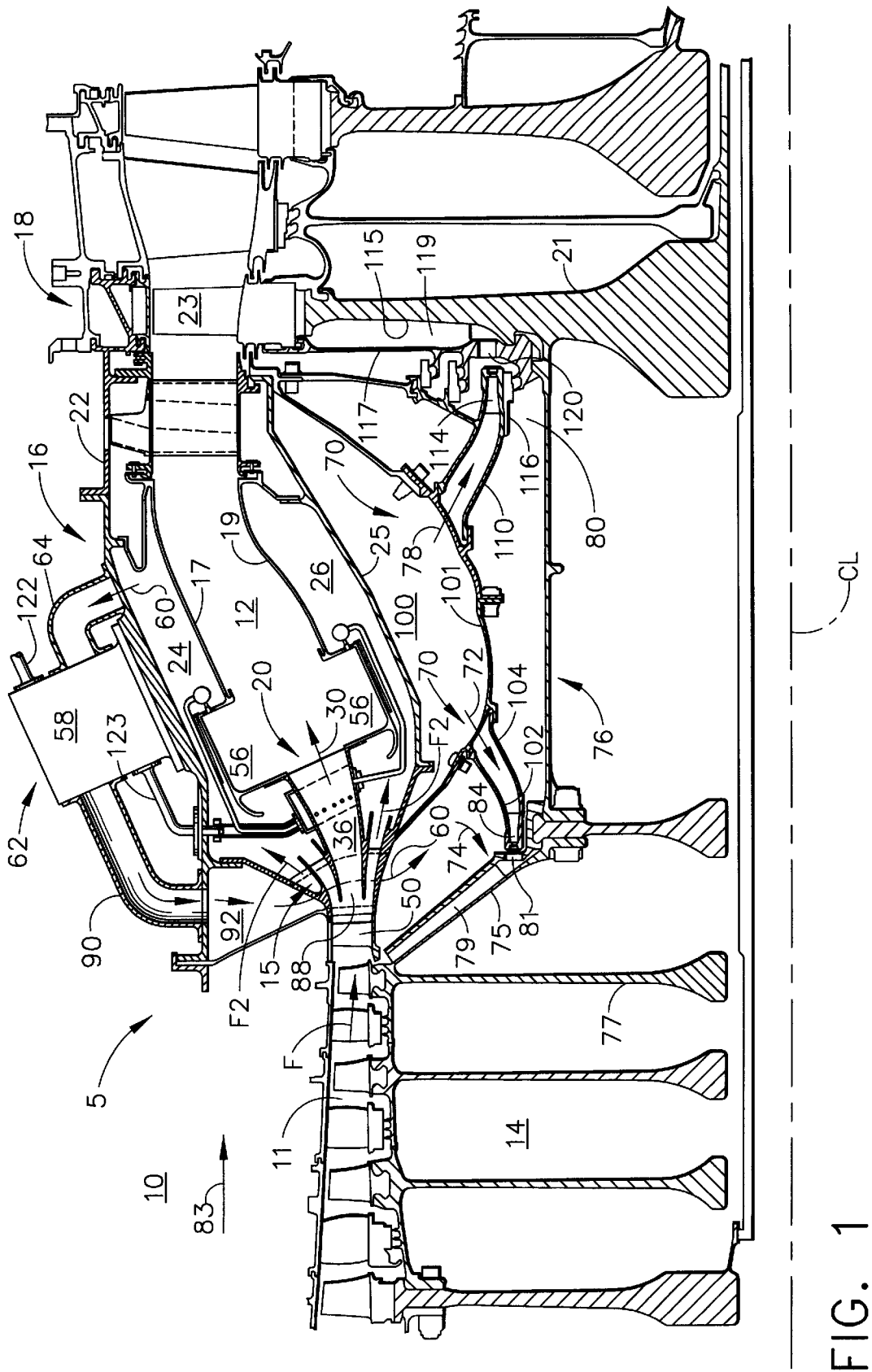
FIG. 1 is a cross-sectional schematic view of part of a core engine of a gas turbine engine including high pressure compressor, combustor, and high pressure turbine sections together with a high pressure compressor and turbine cooling system in accordance with the present invention.
Figure 2:
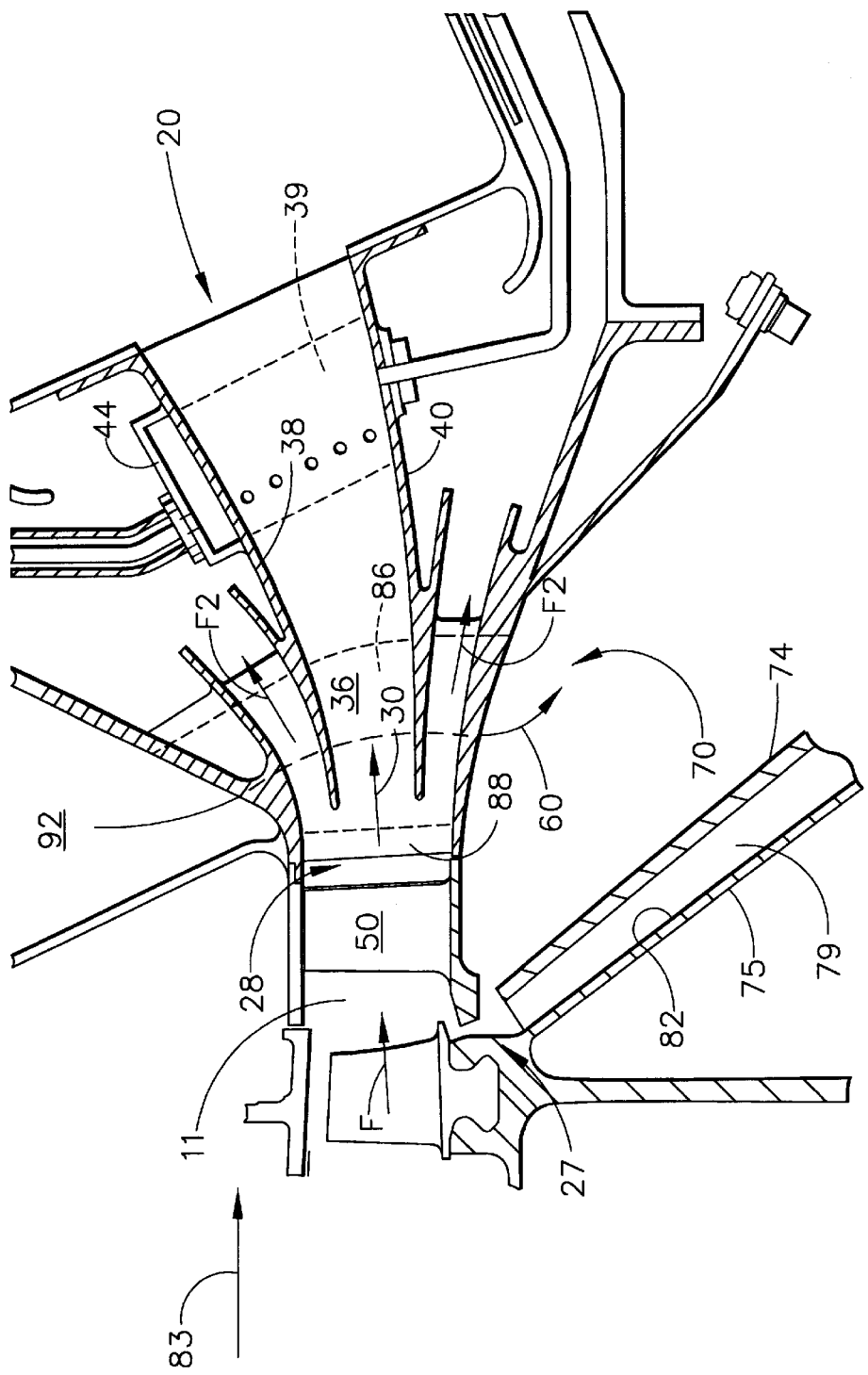
FIG. 2 is an enlarged view of the diffuser section in FIG. 1.

Illustrated in FIGS. 1 and 2 is a portion of an axial flow gas turbine core engine 10 having a core flowpath 11 therethrough and a cooling system generally indicated at numeral 5. The core engine 10 includes, in serial downstream flow relationship, a high pressure compressor 14, a diffuser section 15, a combustor 16, and a high pressure turbine 18. The combustor 16 is a high inlet temperature combustor which is designed to operate in a region above 1400° F. (the exit temperature may approach 4000° F.) and has a hollow body defining a combustion chamber 12 therein. Combustor 16 is generally annular in form about an engine centerline CL and includes an outer liner 17, an inner liner 19, and a dome inlet module designated generally by the numeral 20. An engine casing 22 surrounds combustor 16 so that an outer radial passage 24 is formed between the engine casing 22 and the outer liner 17 and an inner radial passage 26 is defined between an inner combustor casing 25 and inner liner 19. The combustor's outer and inner liners 17 and 19, respectively, incorporate a trapped vortex cavity 56 as disclosedlin U.S. Pat. No. 5,619,855 which is incorporated herein by reference.

The dome inlet module 20 is in flow communication with a compressor discharge end 28 of the high pressure compressor 14 positioned upstream thereof. The dome inlet module 20 is designed to receive combustor air flow 30 which is a substantial first portion of pressurized air of a compressed air flow F produced by the compressor 14 at what is referred to as compressor discharge pressure (CDP). CDP is conventionally defined as the pressure of the compressed air flow F at the exit of last stage 27 of the high pressure compressor 14, typically denoted at compressor outlet guide vanes 50. A second portion F2 of the compressed air flow F produced by the upstream compressor is flowed around the outer and inner liners 17 and 19, respectively, through the outer and inner radial passages 24 and 26, respectively.

Figure 3:
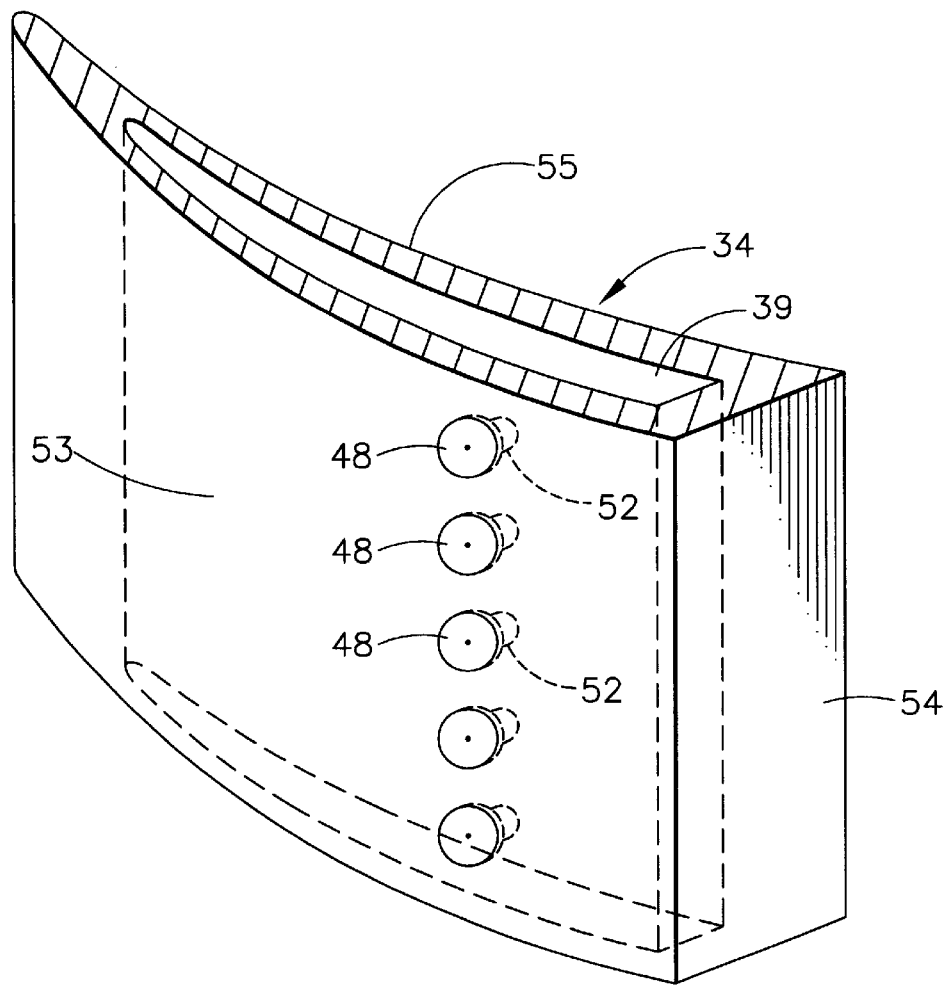
FIG. 3 is a perspective schematic illustration of a radially extending portion of a short diffuser vane in a diffuser section of the engine in FIG. 1.
Figure 4:
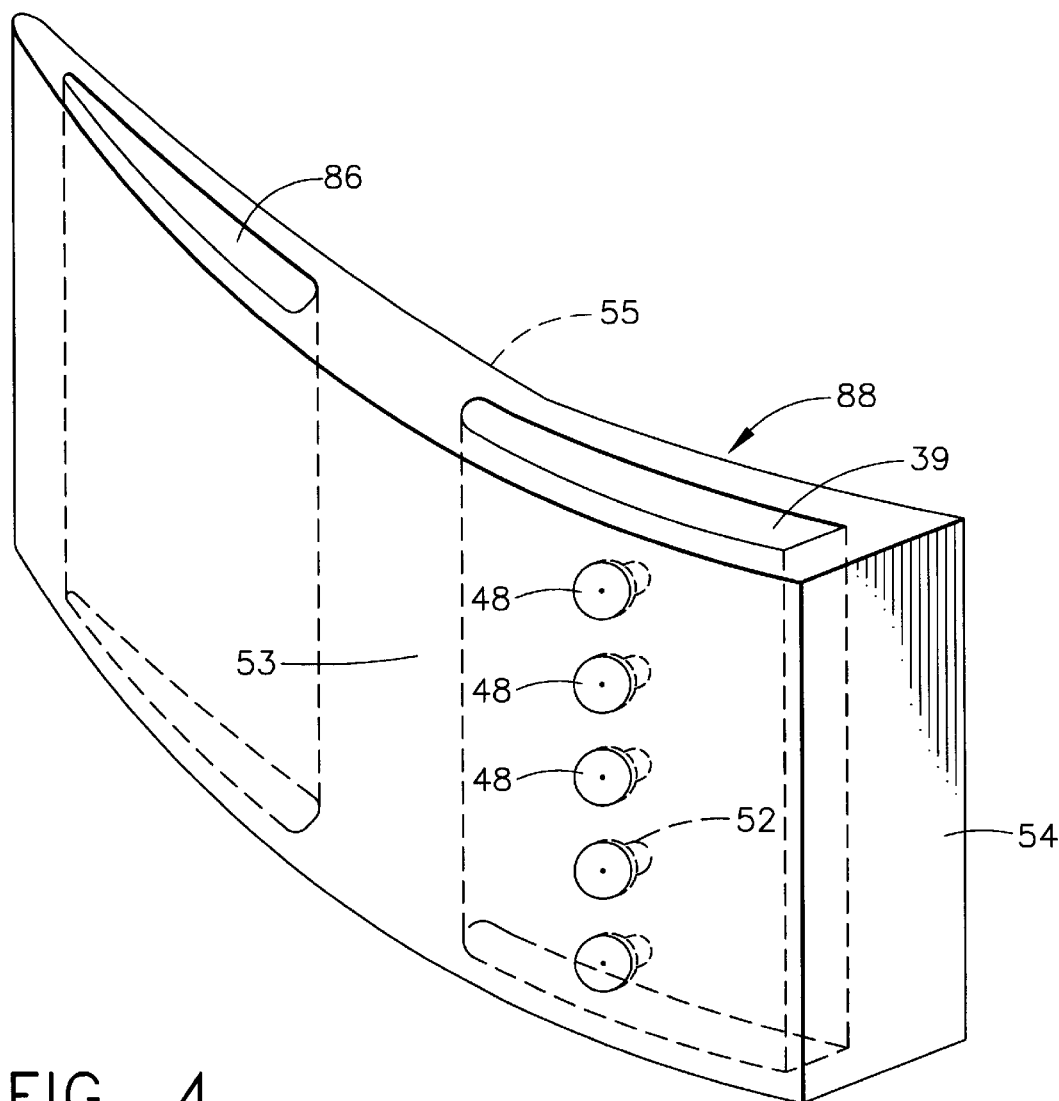
FIG. 4 is a perspective schematic illustration of view of a radially extending portion of an extended diffuser vane in the diffuser section of the engine in FIG. 1.
Figure 5:
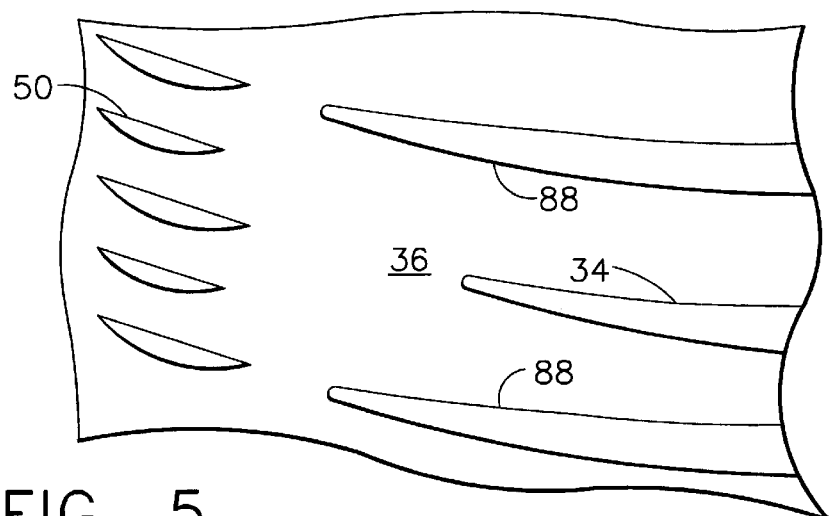
FIG. 5 is a cross-sectional rolled out schematic illustration of an arrangement of the diffuser vanes of FIGS. 3 and 4 in the diffuser section of the engine in FIG. 1.

A first plurality of short diffuser vanes 34 (illustrated in FIGS. 3 and 5) and a second plurality of extended diffuser vanes 88 (illustrated in FIGS. 1, 2, 4, and 5) are positioned circumferentially within the diffuser section 15 and extending radially across a diffuser flow passage 36 of the diffuser section. The diffuser flow passage 36 is defined by an outer member 38 and an inner member 40 of the diffuser and forms part of the core flowpath 11. The second plurality of extended diffuser vanes 88 are inter-dispersed between the first plurality of short diffuser vanes 34 at the rate of one short diffuser vane between each two extended diffuser vanes, as illustrated in FIG. 5. The short and extended diffuser vanes 34 and 88, respectively, are designed to provide some degree of residual swirl to the combustor air flow 30 and provide a mechanical load path across the diffuser flow passage 36.

Fuel is provided to the dome inlet module 20, where it is mixed with combustor air flow 30 flowing therethrough. At least some and as many as all of the short and extended diffuser vanes 34 and 88, respectively, contain a fuel chamber 39, in the form of a hollow area, which is in flow communication with a fuel manifold 44 positioned adjacent and around outer member 38 of dome inlet module 20. Fuel is piped into to the fuel manifold 44 in a manner described later herein. Fuel from the fuel manifold 44 enters the fuel chamber 39 and is thereafter injected into diffuser flow passage 36 through apertures such as atomizers 48 positioned within a plurality of apertures 52 formed in the suction and pressure sides 53 and 55, respectively, of the short and extended diffuser vanes 34 and 88, respectively.

Trailing edges 54 of the short and extended diffuser vanes 34 and 88, respectively, are preferably somewhat blunt in shape to generate shear layers in the diffuser flow passage 36 to enhance mixing of fuel with the combustor air flow 30. In order to provide the desired amount of mixing of fuel and air within diffuser flow passage 36 of dome inlet module 20, the ratio of the short and extended diffuser vanes 34 and 88, respectively, to the number of the compressor outlet guide vanes 50 might be in a range of 1:1 to 1:2 (e.g., approximately 100 to 120 outlet guide vanes). In the exemplary embodiment illustrated herein there are half as many of the short and extended diffuser vanes 34 and 88, respectively, as there are compressor outlet guide vanes 50.

The cooling system 5 is used to supply cooled air for reducing the temperatures experienced by a relatively hot running first stage turbine rotor disk 21 and turbine blades 23 and for portions of the last stage 27 (or stages) of the high pressure compressor 14. The cooling system 5 is designed to tailor cooling airflow to different engine components to the meet different requirements such as that of turbine components and compressor components. For example, the cooling flow to the compressor components may be only 10% of the total cooling flow supplied by the cooling system and the cooling flow to the turbine components may be 90%. The pressure of the cooling flows to the compressor and turbine components may also be significantly different.

Referring to FIGS. 1 and 2, the cooling system 5 includes a first flow means, generally indicated by numeral 62, for flowing cooling air 60, which is a portion of the second portion F2 of the compressed air flow F, to a heat exchanger 58 to cool the cooling air 60. Many types of first flowing means are well known in the art and is illustrated herein as bleed ducting 64, which may be made of pipes, operably mounted on the engine casing 22 surrounding the combustor 16 to bleed the cooling air 60 of the combustor air flow 30 from high pressure compressor 14 that is in the outer radial passage 24. The bleed ducting 64 may be manifolded to flow the cooling air 60 into one or more heat exchangers 58 or the bleed ducting 64 may be arranged such that each one of its ducts or pipes is arranged to flow its respective amount of the cooling air 60 into a single heat exchanger. It apparent that the pressure of the cooling air 60 of the combustor air flow 30 in the outer radial passage 24 is slightly lower than at the end of the diffuser section 15.

A second flowing means 70 is provided for flowing a first portion 72 of the cooling air 60 to a compressor impeller 74 for boosting pressure of the first portion of the cooling air and for flowing a second portion 78 of the cooling air to a turbine cooling means 80 for cooling components of the high pressure turbine 18 or other turbine portions of the engine such as of the low pressure turbine (not shown). An impeller is understood in the art to be a pump used to boost or raise the pressure of the fluid passing through the impeller.

The second flowing means 70 includes a radial vane airflow passage 86 through the extended vanes 88, as illustrated in FIG. 2. The cooling air 60 is ducted from the heat exchanger 58, after it has been cooled, through return ducting 90 and through the engine casing 22 to a plenum 92. The radial vane airflow passage 86 are open at their radial outer ends to the plenum 92 and to a radially inner chamber 100 formed between the inner combustor casing 25 and a more radially inward chamber wall 101. A compressor cooling manifold 104 leads from the inner chamber 100 to the compressor inducer 84 located at an upstream end 102 of the compressor cooling manifold.

The compressor impeller 74 is disposed on a downstream facing side 82 of a downstream tapering conical shaft section 75 which is directly bolted to a last stage compressor disk 77 of the high pressure compressor 14. The conical section 75 is part of a high pressure rotor 76 and used to connect the last stage compressor disk 77 to the first stage turbine rotor disk 21. The compressor impeller 74 has a plurality of radial compressor impeller passages 79 with compressor impeller inlets 81 which open in a downstream direction 83 and are located on the downstream facing side 82 of the conical section 75. A compressor inducer 84 is operably disposed to receive the first portion 72 of the cooling air 60 and direct the first portion 72 into the compressor impeller inlets 81 in a direction substantially tangential to the compressor disk 77. The relatively static compressor inducer 84 is positioned directly near the compressor impeller inlets 81 to inject the first portion 72 into the compressor impeller inlets in a direction substantially tangential to and in the rotational direction of the rotatable compressor disk 77 about the engine centerline CL. The first portion 72 of the cooling air 60 has its pressure substantially boosted above the compressor discharge pressure CDP and is directed to cool the last stage 27 of the high pressure compressor 14 by the compressor impeller 74. In this manner the engine expends only that amount of power to boost the pressure of only the first portion 72 of the cooling air 60.

The second portion 78 of the cooling air which is directed to a turbine cooling means 80 for cooling components of the high pressure turbine 18 does not have to be boosted (if at all) to as great a pressure level as the second portion 78 of the cooling air because the second portion is flowed into a lower pressure area of the engine. Conventionally, cooling of the high pressure turbine 18 is accomplished by flowing cooling air through various cooling paths through the high pressure turbine such as to cool the high pressure turbine blades 23. A turbine cooling manifold 110 leads from the inner chamber 100 to a second inducer 114 located at a downstream end 116 of the compressor cooling manifold. The turbine cooling means 80 includes turbine impeller 117 mounted on an upstream face 115 of the rotatable turbine disk 21. The turbine impeller 117 has a second plurality of radial turbine impeller passages 119 with turbine impeller inlets 120 located on the upstream face 115. The relatively static second inducer 114 is positioned directly near turbine impeller inlets 120 of the rotatable turbine disk 21 to inject the second portion into the turbine impeller inlets in a direction substantially tangential to and in the rotational direction of the rotatable turbine disk about the engine centerline CL. This allows the compressor and turbine impeller to be tailored for their respective flow and pressure requirements such that the engine expends only that amount of power needed to boost the pressures of the first and second portions 72 and 78, respectively, of the cooling air 60; thus, maximizing the engine's efficiency.

The heat exchanger 58 is preferably a fuel to air heat exchanger illustrated as having inlet fuel piping 122 entering the heat exchanger and outlet fuel piping 123 exiting leading from the heat exchanger to the fuel manifold 44 for distribution to each of the fuel chambers 39 in the vanes 34. For safety purposes, an intermediate fluid heat exchanger may be used to transfer heat from the portion of the pressurized air from the first flowing means to the fuel flow supplied by the piping. The turbine cooling means may include other apparatus for flowing the second portion of the cooling air to other areas of the high pressure and low pressure turbines.

While the preferred embodiment of our invention has been described fully in order to explain its principles, it is understood that various modifications or alterations may be made to the preferred embodiment without departing from the scope of the invention as set forth in the appended claims.

What is claimed is:

1. A gas turbine engine cooling system for providing cooling air to engine components, said system comprising:
a core engine having, in downstream serial flow relationship, a high pressure compressor, a combustor, and high pressure turbine drivingly connected to said high pressure compressor and a core flowpath therethrough;
said high pressure compressor being effective for providing pressurized air;
a first flowing means for flowing a portion of the pressurized air to a heat exchanger to cool the portion of the pressurized air and form the cooling air;
a second flowing means for flowing a first portion of the cooling air to a compressor impeller for boosting pressure of the first portion of the cooling air and operable for flowing a second portion of the cooling air to a turbine cooling means for cooling components of said high pressure turbine; and
said compressor impeller operably connected to a compressor disk of said high pressure compressor.

2. A system as claimed in claim 1 wherein said compressor impeller includes a first plurality of radial impeller passages with compressor impeller inlets located open in a downstream facing direction away from said compressor disk and a compressor inducer effective for channeling the first portion of the cooling air into said compressor impeller inlets in a direction substantially tangential to said compressor disk.

3. A system as claimed in claim 2 wherein said heat exchanger is a fuel to air heat exchanger for cooling the portion of the pressurized air from said first flowing means with fuel.

4. A system as claimed in claim 3 wherein said combustor is connected to said heat exchanger to receive the fuel from said heat exchanger after the fuel has been used for cooling the portion of the pressurized air from said first flowing means.

5. A system as claimed in claim 3 further comprising a first plurality of vanes positioned circumferentially around and extending radially across said core flowpath and axially located between said core compressor and said combustor and said second flowing means includes at least one radial vane airflow passage through each of said first plurality of vanes.

6. A system as claimed in claim 5 further comprising a fuel chamber within at least some of said vanes effective for receiving the fuel for injection into said core flowpath through apertures positioned across sides of said some of said vanes.

7. A system as claimed in claim 1 wherein said turbine cooling means includes a turbine impeller for boosting pressure of said second portion of the cooling air.

8. A system as claimed in claim 2 wherein said compressor impeller is disposed on a downstream facing side of a downstream tapering conical shaft section.

9. A system as claimed in claim 8 wherein said compressor impeller includes a first plurality of radial impeller passages with compressor impeller inlets located open in a downstream facing direction away from said compressor disk and a compressor inducer effective for channeling the first portion of the cooling air into said compressor impeller inlets in a direction substantially tangential to said compressor disk.

10. A system as claimed in claim 9 wherein said heat exchanger is a fuel to air heat exchanger for cooling the portion of the pressurized air from said first flowing means with fuel.

11. A system as claimed in claim 10 wherein said combustor is connected to said heat exchanger to receive the fuel from said heat exchanger after the fuel has been used for cooling the portion of the pressurized air from said first flowing means.

12. A system as claimed in claim 10 further comprising a first plurality of vanes positioned circumferentially around and extending radially across said core flowpath and axially located between said core compressor and said combustor and said second flowing means includes at least one radial vane airflow passage through each of said first plurality of vanes.

13. A system as claimed in claim 12 further comprising a fuel chamber within at least some of said vanes effective for receiving the fuel for injection into said core flowpath through atomizers positioned across sides of said some of said vanes.

14. A system as claimed in claim 8 wherein said turbine cooling means includes a turbine impeller for boosting pressure of said second portion of the cooling air.

15. A system as claimed in claim 14 wherein said compressor impeller includes a first plurality of radial impeller passages with compressor impeller inlets located open in a downstream facing direction away from said compressor disk and a compressor inducer effective for channeling the first portion of the cooling air into said compressor impeller inlets in a direction substantially tangential to said compressor disk.

16. A system as claimed in claim 15 wherein said heat exchanger is a fuel to air heat exchanger for cooling the portion of the pressurized air from said first flowing means with fuel.

17. A system as claimed in claim 16 wherein said combustor is connected to said heat exchanger to receive the fuel from said heat exchanger after the fuel has been used for cooling the portion of the pressurized air from said first flowing means.

18. A system as claimed in claim 16 further comprising a first plurality of vanes positioned circumferentially around and extending radially across said core flowpath and axially located between said core compressor and said combustor and said second flowing means includes at least one radial vane airflow passage through each of said first plurality of vanes.

19. A system as claimed in claim 18 further comprising a fuel chamber within at least some of said vanes effective for receiving the fuel for injection into said core flowpath through atomizers positioned across sides of said some of said vanes.

* * * * *